United States Patent
Lundh et al.

(10) Patent No.: US 8,488,464 B2
(45) Date of Patent: Jul. 16, 2013

(54) HSDPA FLOW CONTROL DATA FRAME, FRAME SEQUENCE NUMBER

(75) Inventors: Peter Lundh, Skärholmen (SE); Szilveszter Nadas, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1049 days.

(21) Appl. No.: 11/568,533

(22) PCT Filed: Dec. 22, 2004

(86) PCT No.: PCT/SE2004/002006
§ 371 (c)(1),
(2), (4) Date: Jul. 30, 2007

(87) PCT Pub. No.: WO2005/104672
PCT Pub. Date: Nov. 10, 2005

(65) Prior Publication Data
US 2008/0002656 A1      Jan. 3, 2008

Related U.S. Application Data

(60) Provisional application No. 60/568,318, filed on May 5, 2004.

(51) Int. Cl.
*H04L 1/00* (2006.01)
*H04L 12/26* (2006.01)
*H04W 24/00* (2009.01)
*H04W 40/00* (2009.01)

(52) U.S. Cl.
USPC ........... 370/235; 370/229; 370/231; 455/423; 455/424; 455/445

(58) Field of Classification Search
USPC .................. 455/423, 424, 445, 561; 370/328, 370/310, 350, 231, 235, 237, 229
See application file for complete search history.

(56) References Cited

U.S. PATENT DOCUMENTS 5,526,399 A * 6/1996 Kameda ....................... 455/74.1
6,393,482 B1   5/2002 Rai et al.
(Continued)

FOREIGN PATENT DOCUMENTS

| EP | 1341318 A2 | 9/2003 |
| EP | 1363428 A2 | 11/2003 |
| JP | H02-016840 | 1/1990 |
| JP | 2003-348011 A | 12/2003 |
| JP | 2003-348012 A | 12/2003 |
| WO | WO 01/37507 A2 | 5/2001 |

OTHER PUBLICATIONS

3GPP. 3$^{rd}$ Generation Partnership Project; Technical Specification Group Radio Access Network; UTRAN $I_{ub}$ Interface User Plane Protocols for Common Transport Channel data streams (Release 5). 3GPP TS 25.435 V5.7.0 (Mar. 2004).

(Continued)

*Primary Examiner* — Matthew Sams

(57) ABSTRACT

A radio base station (RBS) is described herein that detects when a high-speed downlink shared channel (HS-DSCH) data frame (110) is lost after it was transmitted by a radio network controller (RNC) over a transport link (Iub) towards the RBS (104). To accomplish this, the RBS (104) upon receiving a HS-DSCH data frame (110) inspects a frame sequence number (302) located within the received HS-DSCH data frame (110) to determine if the frame sequence number (302) is in sequence with a frame sequence number (302) located within a previously received HS-DSCH data frame (110). If the two frame sequence numbers (302) are not in sequence, then one or more HS-DSCH data frames (110) that were previously transmitted towards the radio base station (104) have been lost. If the radio base station (104) detects to many lost HS-DSCH data frames (110a), then it can correct the problem by reducing the bit rate of a certain HS user flow or by reducing the maximum bit rate for all of the HS traffic which is going to be sent by the radio network controller (102) over the transport link (106) to the radio base station (104).

16 Claims, 2 Drawing Sheets

U.S. PATENT DOCUMENTS

| | | | |
|---|---|---|---|
| 7,388,903 B2 * | 6/2008 | Godfrey | 375/219 |
| 2003/0012217 A1 | 1/2003 | Andersson et al. | |
| 2003/0026207 A1 | 2/2003 | Loguinov | |
| 2003/0050086 A1 * | 3/2003 | Lee et al. | 455/522 |
| 2003/0123403 A1 | 7/2003 | Jiang | |
| 2003/0147371 A1 | 8/2003 | Choi | |
| 2003/0169740 A1 | 9/2003 | Harris | |
| 2003/0214906 A1 * | 11/2003 | Hu et al. | 370/231 |
| 2004/0027997 A1 | 2/2004 | Terry | |
| 2004/0073641 A1 * | 4/2004 | Minhazuddin et al. | 709/223 |
| 2004/0184424 A1 * | 9/2004 | Shibata et al. | 370/331 |

OTHER PUBLICATIONS

3GPP. $3^{rd}$ Generation Partnership Project; Technical Specification Group Radio Access Network; UTRAN Iu Interface User Plane Protocols (Release 6). 3GPP TS 25.415 V6.0.0 (Dec. 2003).

3GPP. $3^{rd}$ Generation Partnership Project; Technical Specification Group Radio Access Network; UTRAN Iur Interface User Plane Protocols (Release 6). 3GPP TS 25.425 V6.1.0 (Mar. 2004).

* cited by examiner

HSDPA FLOW CONTROL DATA FRAME, FRAME SEQUENCE NUMBER

CLAIMING BENEFIT OF PRIOR FILED APPLICATION

This application claims the benefit of U.S. Provisional Application Ser. No. 60/568,318 filed on May 5, 2004 and entitled "HSDPA Flow Control Data Frame, Frame number sequence".

BACKGROUND OF THE INVENTION

1. Field of the Invention

The present invention relates in general to a third generation cellular system and, in particular, to a radio base station (RBS) that can detect when a high-speed downlink shared channel (HS-DSCH) data frame is lost after it was transmitted from a radio network controller (RNC) on a transport link (Iub) towards the RBS.

2. Description of Related Art

Today there is a high level of interest in enhancing the performance of a third generation cellular system that implements the high-speed-downlink-packet-access (HSDPA) provision of the Wideband Code Division Multiple Access (WCDMA) standard. The performance of the third generation cellular system could be enhanced if there was a way to detect when a data frame (HS-DSCH data frame) is lost after it was sent from a radio network controller (RNC) on a transport link ("Iub") towards a radio base station (RBS).

It would be desirable to be able to detect lost HS-DSCH data frames, because if too many HS-DSCH data frames are lost and never received by the RBS then this would result in retransmissions between the RNC and a UE (user equipment such as a mobile handset or terminal). The retransmission of information between the RNC and the UE is not desirable because it reduces the HSDPA throughput. Unfortunately, the traditional RBS does not have a way to detect when there is a lost HS-DSCH data frame so it is not able to prevent the problematical retransmissions between the RNC and the UE. This shortcoming is addressed by the present invention.

BRIEF DESCRIPTION OF THE INVENTION

The present invention includes a RBS that detects when a HS-DSCH data frame is lost after it was transmitted by a RNC on a transport link (Iub) towards the RBS. To accomplish this, the RBS upon receiving a HS-DSCH data frame inspects a frame sequence number located within the received HS-DSCH data frame to determine if the frame sequence number is in sequence with a frame sequence number located within a previously received HS-DSCH data frame. If the two frame sequence numbers are not in sequence, then one or more HS-DSCH data frames that were previously transmitted towards the RBS have been lost. If the RBS detects to many lost HS-DSCH data frames, then it can correct the problem by reducing the bit rate of a certain HS user flow or by reducing the maximum bit rate for all of the HS traffic which is going to be sent by the RNC over the transport link to the RBS.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
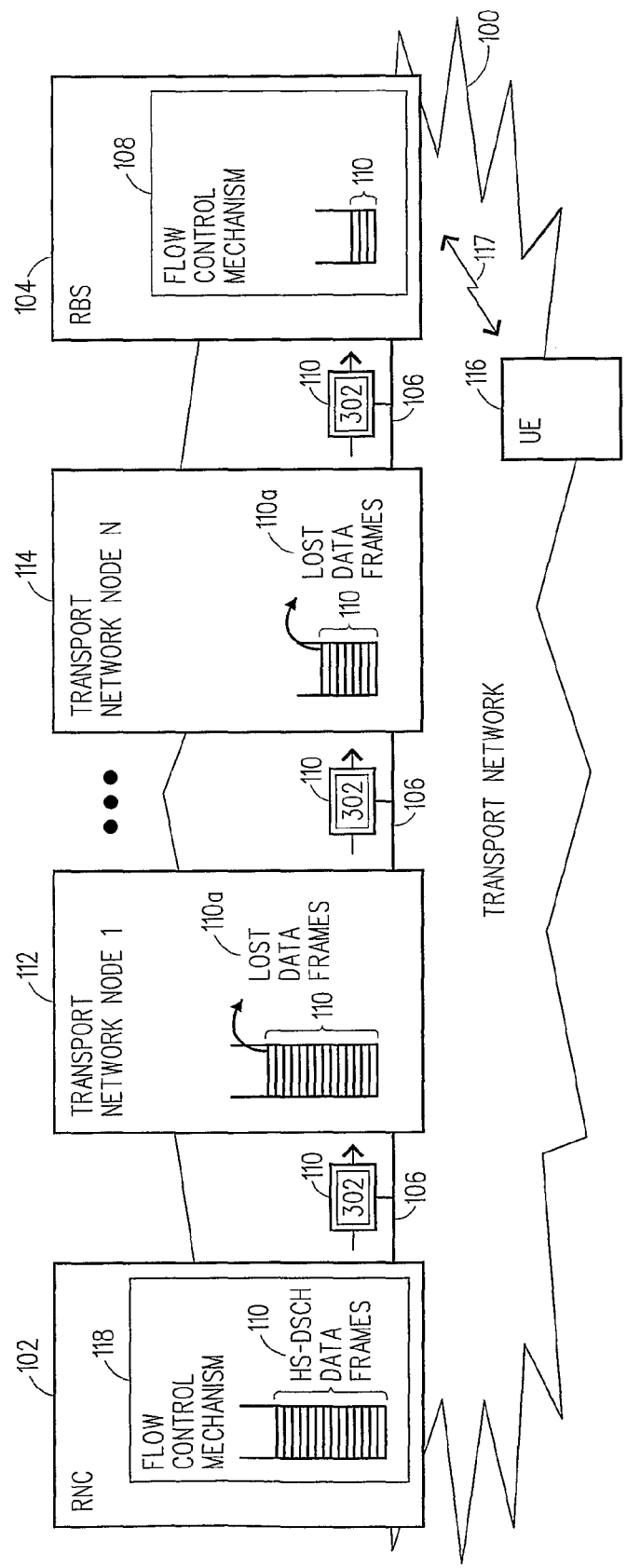
FIG. 1 is a diagram of a third generation cellular network which includes a RBS that can detect lost HS-DSCH data frames in accordance with the present invention.

Referring to FIG. 1, there is shown a block diagram of a third generation cellular network 100 (in particular only a UTRAN 100 (UMTS Terrestrial Radio Access Network 100 is shown) that has a RNC 102 and a RBS 104 which are connected to one another via a transport link 106 (Iub 106). The RBS 104 includes a flow control mechanism 108 that can detect when a data frame 110 (HS-DSCH data frame 110) which should have been received by the RBS 104 has instead become lost sometime after it was sent from the RNC 102 on the Iub 106 towards the RBS 104. A HS-DSCH data frame 110 can become lost due to buffer overloads in transport nodes 112 and 114 (only two shown) which are located between the RNC 102 and RBS 104. It is important that the RBS 104 is able detect a lost HS-DSCH data frame 110a so that the RBS 104 can take corrective action when there are too many lost HS-DSCH data frames 110a in order to prevent retransmissions between the RNC 102 and a UE 116 (only one shown). How the RES 104 can detect lost HS-DSCH data frames 110a and the possible corrective actions which can be taken if there are too many lost HS-DSCH data frames 110a are described in detail below with respect to FIGS. 2-3.

The RBS 104 by being able to detect the lost HS-DSCH data frames 110a enables the detection of an Iub problem in the area of HSDPA. HSDPA is a wideband radio access network (WRAN) service that utilizes the air-interface 117 in an efficient manner by implementing shorter Transmit Time Intervals (TTIs). In accordance with the HSDPA, the air-interface power that is left between dedicated channel (DCH) users e.g., voice users, and the maximum power from the RBS power amplifier can be used for HSDPA users 116 (HS users 116). For clarity, the DCH users have not been shown. Because, HS users 116 get a service similar to best effort means that the bit rate an HS user 116 can have over the air interface 117 varies anywhere from a high bit rate (being in the cell with line of sight and with a few DCH users) to a low bit rate (being in a cell without a line of sight and with a lot of DCH users).

The HSDPA also supports a similar best effort of service for HS users 116 with respect to the transport link 106. Thus, HS-DSCH data frames 110 which are used by the HS user 116 are not admission controlled like the DCH data frames where each DCH flow has a certain bandwidth and a certain delay over the Iub 106. Instead, HS-DSCH data frames 110 which can belong to one or hundreds of medium access control-d (MAC-d) flows that share the same 'best effort' type of quality of service (QoS) class over the Iub 106. It should be noted that each MAC-d flow has a queue in the RNC 102 and RBS 104. And, each MAC-d flow competes on ATM adaptation layer 2 (AAL2) Class C path(s) that are carried over unspecified bitrate (UBR+) type of ATM connections, or CBR VC or an IP-based transport network. If the IP-based transport is used, then the present invention is even more advantageous as it is not possible to use a CRC based congestion detection technique.

Because, HS-DSCH data frames 110 use a best effort type of service on the transport link 106 means that the detection of an Iub problem that occurs when there are too many lost HS-DSCH data frames 110a (too high a frames loss ratio) is important so that the Iub problem can be corrected. The Iub problem may be caused if there is too much HS traffic over a scarce Iub 106 which means that HS-DSCH data frames 110 are going to be dropped which increases a round trip time (RTT) to a point where an end-user 116 has a poor throughput. This type of Iub problem can be especially problematic to end-users 116 that use Transmission Control Protocol (TCP) for the packet data service because TCP is very sensitive to long RTTs. This Iub problem can also be problematic to end-users that use real-time services like voice over IP or real-time gaming. Another possible problem caused by an increased RTT is the loss of important signaling PDUs which are transmitted using the same best-effort transport network service. And, an extremely high HS-DSCH data frame loss ratio can cause any of these connections to be lost.

Figure 3:
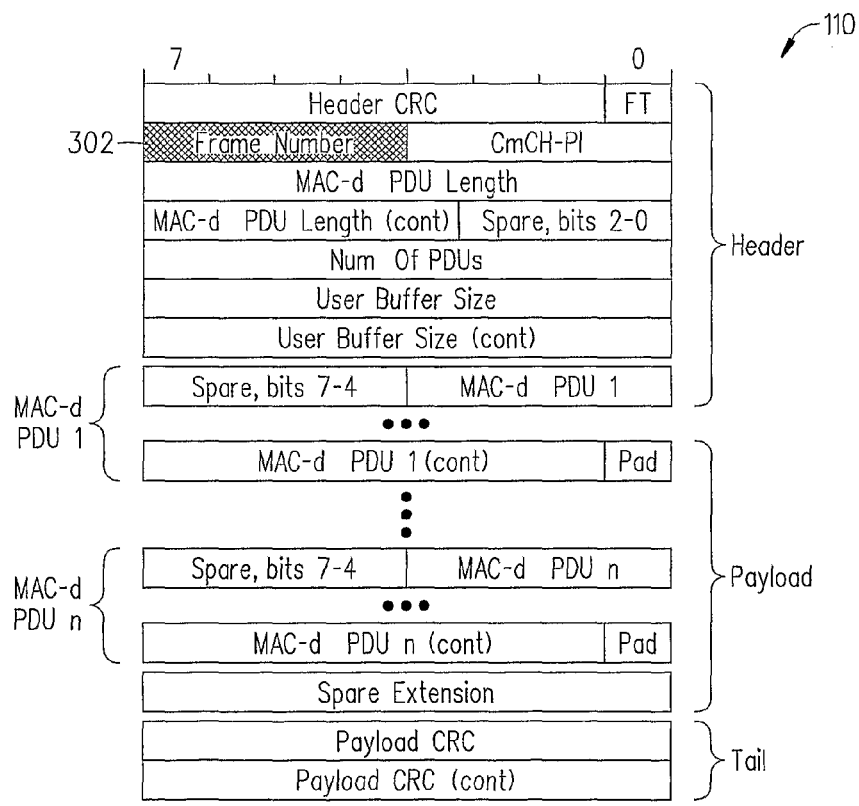
FIG. 3 is a diagram indicating the preferred structure of a HS-DSCH data frame which includes a 4-bit frame number sequence that enables the RBS to detect lost HS-DSCH data frames in accordance with the present invention.

To detect this Iub problem, the present invention introduces the use of a frame sequence number 302 into the HS-DSCH data frame 110 (see FIG. 3). The frame sequence number 302 makes it possible for the RBS 104 to detect completely lost HS-DSCH data frames 110a. In order to accomplish this, the WCDMA RAN HSDPA hardware and software in the RNC 102 (including a flow control mechanism 118) and RBS 104 needs to be prepared for the introduction and use of the frame sequence number 302 into the HS-DSCH data frame structure. More specifically, the RNC 102 would have to add a frame sequence number 302 (e.g., 4-bit frame sequence number 302) in each HS-DSCH data frame 110 that is sent to the RBS 104. And, the RBS 104 would have to compare the frame sequence number 302 in a received HS-DSCH data frame 110 with the frame sequence number 302 in a previously received HS-DSCH data frame 110 to determine if any HS-DSCH data frames 110 happened to be transmitted between the two received HS-DSCH data frames 110 but were never received by the RBS 104. If so, then these HS-DSCH data frames 110 would be lost HS-DSCH data frames 110a. One way this can be done is described next.

Figure 2:
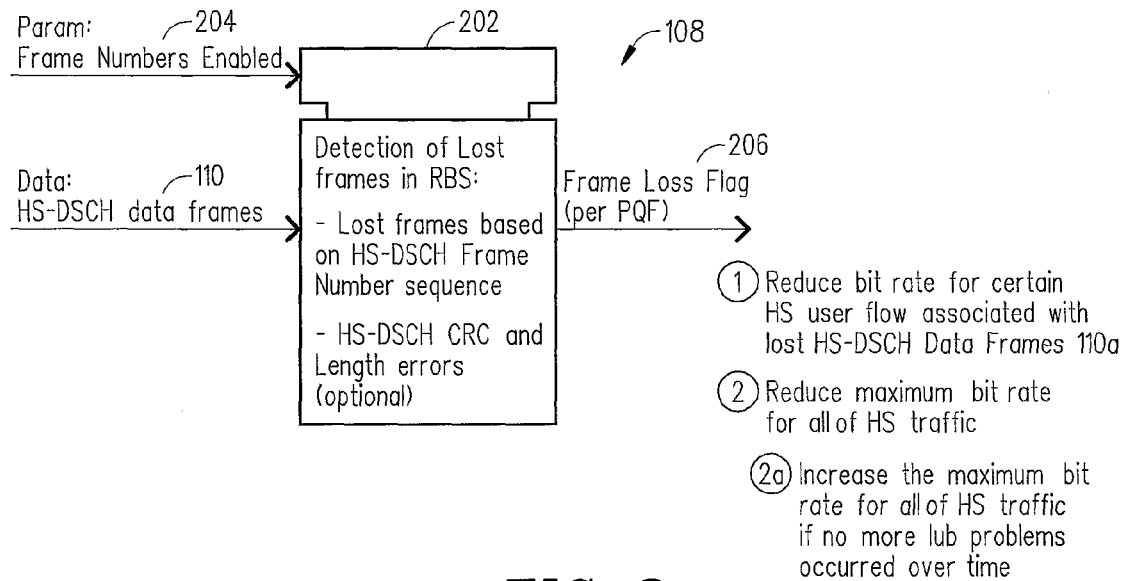
FIG. 2 is a diagram that illustrates how the RBS can detect lost HS-DSCH data frames in accordance with the present invention.

Referring to FIG. 2, there is a block diagram that is used to help describe how the RBS 104 and in particular the flow control mechanism 108 can detect a lost HS-DSCH data frame 110a. As shown, the flow control mechanism 108 (frame handler 202) has two inputs: (1) FrameNumbersEnabled 204; and (2) HS-DSCH data frames 110 (per priority queue flow (PQF)). And, one output: (1) FrameLossFlag 206 (per PQF). The flow control mechanism 108 detects lost HS-DSCH data frames 110 by finding wrong frame sequence numbers 302. More specifically, holes in the frame sequence numbers 302 that go from 0 to 15 (for example) within received HS-DSCH data frames 110 can indicate if there is one ore more lost HS-DSCH data frames 110a. For instance, HS-DSCH data frames 110 that are received and have frame sequence numbers 302 of ... 12, 13, 14, 0, 1, 2, 3, 4, ... would indicate that one HS-DSCH data frame 110a with the frame sequence number 302 of 15 is lost.

In addition to detecting lost HS-DSCH data frames 110a, the flow control mechanism 108 may be configured to detect damaged HS-DSCH data frames 110. The detection of damaged HS-DSCH data frames 110 is possible when one or more asynchronous transfer mode (ATM) cells are lost out of the e.g. 10 ATM cells typically used in a HS-DSCH data frame 110. More specifically, if a received HS-DSCH data frame 110 is missing one or more ATM cells, then the cyclic redundancy check (CRC) and frame length indicator (LI) will indicate this and the flow control mechanism 108 would label this data frame as a damaged HS-DSCH data frame 110. If this functionality is implemented, then the detection of lost HS-DSCH data frames 110a would work in parallel with the functionality that discovers 'completely lost' data frames. From a higher protocol point of view, the damaged HS-DSCH data frames 110 are considered lost because the damaged HS-DSCH data frames 110 cannot be used. As such, the difference between lost and damaged HS-DSCH data frames 110a is in the detection of the event not the reaction to it. The reaction to having too many lost and/or damaged HS-DSCH data frames 110a is described next.

In the preferred embodiment, the RBS 104 and in particular a frame handler 202 outputs a set FrameLossFlag 206 if one or more lost/damaged HS-DSCH data frames 110a are detected during a 100 ms period. In response to receiving a set FrameLossFlag 206, the flow control mechanism 108 can temporarily decrease the bit rate (CARate) for the particular priority queue flow (PQF) of HS-DSCH data frames 110 that has the high frame loss ratio (see numeral "1" in FIG. 2). To temporarily decrease the bit rate of a certain flow of HS-DSCH data frames 110, the RBS 104 can send Capacity Allocation (CA) messages (not shown) to the RNC 102. And, if too many lost/damaged HS-DSCH data frames 110a occur over a certain period of time, then the RBS 104 could lower the maximum bit rate (TargetHSRate) for all of the HS traffic sent over the Iub 106 (see numeral "2" in FIG. 2). Thereafter, if no more Iub problems have occurred over a period of time, then the RBS 104 could increase the maximum bit rate (TargetHSRate) for the HS traffic (see numeral "2a" in FIG. 2).

Referring to FIG. 3, there is a block diagram that indicates the preferred structure of the HS-DSCH data frame 110 which includes the 4-bit frame sequence number 302 in accordance with the preferred embodiment of the present invention. If the 4-bit frame sequence number 302 was introduced into the HS-DSCH data frame 110, then the following "italicized" changes indicated below may be made to section 6.2.7 "Coding of Information Elements in Data Frames" in standard 3GPP TS 25.435 (version 5).

6.2.7.1 Header CRC

Description: Cyclic Redundancy Checksum calculated on the header of a data frame with polynom: $X^7+X^6+X^2+1$. The CRC calculation shall cover all bits in the header, starting from bit 0 in the first byte (frame type (FT) field) up to the end of the header.

Value range: {0 ... 127}.

Field length: 7 bits.

6.2.7.2 Frame Type

Description: Describes if it is a control frame or a data frame.

Value range: {0=data, 1=control}.

Field Length: 1 bit.

6.2.7.3 Connection Frame Number (CFN)

Description: Indicator as to which radio frame the first data was received on uplink or shall be transmitted on downlink. The value range and field length depend on the transport channel for which the CFN is used.

Value range (PCH): {0 ... 4095}.

Value range (other): {0 ... 255}.

Field length (PCH): 12 bits.

Field length (other): 8 bits.

6.2.7.4 Transport Format Indicator

Description: TFI is the local number of the transport format used for the transmission time interval.

Value range: {0 ... 31}.

Field length: 5 bits.

6.2.7.5 Propagation Delay [FDD]

Description: One-way radio interface delay as measured during RACH access.
Value range: {0 ... 765 chips}.
Granularity: 3 chips.
Field length: 8 bits.

6.2.7.6 Rx Timing Deviation [3.84 Mcps TDD]

Description: Measured Rx Timing Deviation as a basis for timing advance. This value should consider measurements made in all frames and all timeslots that contain the transport blocks in the payload. In case the Timing Advance Applied IE indicates "No" in a cell, the Rx Timing Deviation field shall be set to N=0.
Value range: {−256 ... +256 chips}.
{N*4-256} chips≦RxTiming Deviation<{(N+1)*4-256} chips. With N=0, 1, ... , 127.
Granularity: 4 chips.
Field length: 7 bits.

6.2.7.6A Received SYNC UL Timing Deviation [1.28 Mcps TDD]

Description: Measured Received SYNC UL Timing Deviation as a basis for propagation delay.
Value range: {0, ... , +256} chips
Granularity: 1 chip.
Field length: 8 bits.

6.2.7.7 Transport Block

Description: A block of data to be transmitted or have been received over the radio interface. The transport format indicated by the TFI describes the transport block length and transport block set size.

6.2.7.8 CRC Indicator

Description: Shows if the transport block has a correct CRC. The UL Outer Loop Power Control may use the CRC indication.
Value range: {0=Correct, 1=Not Correct}.
Field length: 1 bit.

6.2.7.9 Payload CRC

Description: Cyclic Redundancy Checksum calculated on the payload of a data frame with polynom $X^{16}+X^{15}+X^2+1$. The CRC calculation shall cover all bits in the data frame payload, starting from bit 7 in the first byte up to bit 0 in the byte before the payload CRC.
Field length: 16 bits.

6.2.7.10 Transmit Power Level

Description: Preferred transmission power level during this TTI for the corresponding transport channel. The indicated value is the negative offset relative to the maximum power configured for the physical channel(s) used for the respective transport channel. [1.28 Mcps TDD—The RBS shall ignore the Transmit Power Level in the TDD DSCH DATA FRAME.] [3.84 Mcps TDD—The RBS shall ignore the Transmit Power Level in the TDD DSCH DATA FRAME if closed loop TPC power control is used.]
Value range: {0 ... 25.5 dB}.
Granularity: 0.1 dB.
Field length: 8 bits.

6.2.7.11 Paging Indication (PI)

Description: Describes if the PI Bitmap is present in the payload.
Value range: {0=no PI-bitmap in payload, 1=PI-bitmap in payload}.
Field length: 1 bit.

6.2.7.12 Paging Indication Bitmap (PI-Bitmap)

Description: Bitmap of Paging Indications $PI_0 ... PI_{N-1}$. Bit 7 of the first byte contains PI0, Bit6 of the first byte contains PI1, , ... , Bit7 of the second byte contains PI8 and so on.
Value range: [FDD—{18, 36, 72 or 144 Paging Indications}.]
[3.84 Mcps TDD—{30, 34, 60, 68, 120 and 136} Paging Indications for 2 PICH frames,
{60, 68, 120, 136, 240 and 2721} Paging Indications for 4 PICH frames].
[1.28 Mcps TDD—{44, 88 and 1761} Paging Indications for 2 PICH frames, {88, 176 and 352} Paging Indications for 4 PICH frames].
Field length: [FDD—3, 5, 9 or 18 bytes (the PI-bitmap field is padded at the end up to an octet boundary)].
[3.84 Mcps TDD—4, 5, 8, 9, 15, 17, 30 or 34 bytes (the PI-bitmap field is padded at the endup to an octet boundary)].
[1.28 Mcps TDD—6, 11, 22 or 44 bytes (the PI-bitmap field is padded at the endup to an octet boundary)].

6.2.7.13 Rx Timing Deviation on RACH [3.84 Mcps TDD]
Void.

6.2.7.14 PDSCH Set Id [TDD]

Description: A pointer to the PDSCH Set which shall be used to transmit the DSCH DATA FRAME over the radio interface.
Value range: {0 ... 255}.
Field length: 8 bits.

6.2.7.15 Code Number [FDD]

Description: The code number of the PDSCH (the same mapping is used as for the 'code number' IE).
Value Range: {0 ... 255}.
Field length: 8 bits.

6.2.7.16 Spreading Factor (SF) [FDD]

Description: The spreading factor of the PDSCH.
Spreading factor=0 Spreading factor to be used=4.
Spreading factor=1 Spreading factor to be used=8.
Spreading factor=6 Spreading factor to be used=256.
Value Range: {4, 8, 16, 32, 64, 128, 256}.
Field length: 3 bits.

6.2.7.17 Power Offset [FDD]

Description: Used to indicate the preferred FDD PDSCH transmission power level. The indicated value is the offset relative to the power of the TFCI bits of the downlink DPCCH directed to the same UE as the DSCH.
Power offset=0 Power offset to be applied=−32 dB.
Power offset=1 Power offset to be applied=−31.75 dB.
Power offset=255 Power offset to be applied=+31.75 dB.
Value range: {−32 ... +31.75 dB}.
Granularity: 0.25 dB.
Field length: 8 bits.

6.2.7.18 MC Info [FDD]

Description: Used to indicate the number of parallel PDSCH codes on which the DSCH data will be carried. Where multi-code transmission is used the SF of all codes is the same and code numbers are contiguous within the code tree with increasing code number values starting from the code number indicated in the 'code number' field.
Value range: {1 ... 16}.
Field length: 4 bits.

6.2.7.19 Spare Extension

Description: Indicates the location where new IEs can in the future be added in a backward compatible way.
Field length: 0-32 octets.

6.2.7.20 Quality Estimate (QE) [TDD]

Description: The quality estimate is derived from the Transport channel BER. If the USCH FP frame includes TB's for the USCH then the QE is the Transport channel BER for the selected USCH. If no Transport channel BER is available the QE shall be set to 0. The quality estimate shall be set to the Transport channel BER and be measured in the units TrCH_BER_LOG respectively. The UL Outer Loop Power Control may use the quality estimate.

Value range: {0 ... 255}.
Granularity: 1.
Field length: 8 bits.

6.2.7.21 Common Transport Channel Priority Indicator (CmCH-PI)

Description: CmCH-PI, configured via the Scheduling Priority Indicator in NBAP, is the relative priority of the data frame and the SDUS included.

Value range: {0-15, where 0=lowest priority, 15=highest priority}.
Field length: 4 bits.

6.2.7.22 User Buffer Size

Description: Indicates the users' buffer size (i.e. the amount of data in the buffer) in octets for a given Common Transport Channel Priority Indicator level.

Value range: {0-65535}.
Field length: 16 bits.

6.2.7.23 MAC-d PDU Length

Description: The value of that field indicates the length of every MAC-d PDU in the payload of the HS-DSCH DATA FRAME in number of bits.

Value range: {0-5000}.
Field Length: 13 bits.

6.2.7.24 NumOfPDU

Description: Indicates the number of MAC-d PDUs in the payload.

Value range: {1-255}.
Field Length: 8 bits.

6.2.7.25 MAC-d PDU

Description: A MAC-d PDU contains the MAC-d PDU.
Field length: See the value of the MAC-d PDU Length IE.

6.2.7.26 Cell Portion ID [FDD]

Description: Cell Portion ID indicates the cell portion with highest SIR during RACH access. Cell Portion ID is configured by O&M.

Value range: {0-63}.
Field Length: 6 bits.

6.2.7.27 New IE Flags

Description: Contains flags indicating which information is valid in the fields following the New IE Flags IE. The last bit position of the New IE Flags IE is used as the Extension Flag to allow the extension of the New IE Flags IE in the future.

Value range:

Bit 0-6: Indicates if the bytes following the New IE Flags IE contains a valid data (1) or not (0). The meaning of each bit is explained in the corresponding DATA FRAME subclause;

Bit 7: Indicates if the 1$^{st}$ byte following the New IE Flags IE and the corresponding IEs has additional New IE Flags IE (1) or not (0).

Field length: 8 bits.

6.2.7.28 Frame Number 302

Description: The 4-bit Frame Number is incremented (modulo 16) by SRNC for each transmitted HS-DSCH data frame belonging to one MAC-d CmCH-PI flow. Each flow generates a Frame sequence number.

Value range: {0 ... 15}.
Granularity: 1.
Field length: 4 bits.

It should be appreciated that without the addition of frame number 302 then the structure of the HS-DSCH data frame 110 shown in FIG. 3 and described above would correspond to a traditional HS-DSCH data frame. For a more detailed discussion about the traditional HS-DSCH data frame, HSDPA and WCDMA reference is made to the following standards:

3GPP, TS 25.435, Iub User plane for common channels.
3GPP, TS 25.425, Iur User plane for common channels.
3GPP, TS 25.415, UTRAN Iu interface user plane protocols.

The contents of these standards are hereby incorporated by reference herein.

Following are some additional features, advantages and uses of the present invention:

The present invention introduces HS-DSCH FP Data Frames Frame sequence number of 4-bits per MAC-d Priority level (CmCH-PI) flow which makes it possible to detect completely lost data frames. This solution makes the ATM-based transport network solution, which WRAN uses today, compatible with a future IP-based transport network.

The present invention is related to another Patent Application, International Application Number PCT/SE2004/002024 filed on Dec. 28, 2004 which claims the benefit of U.S. Provisional Application No. 60/568,389 filed May 5, 2004 entitled "HSDPA Flow Control, Control Frames RTT Measurement". This particular invention detects and corrects an Iub problem that is associated with too long of RTT times and can be used in conjunction with the present invention. The contents of this patent application are hereby incorporated by reference The present invention is related to another Patent Application, International Application Number PCT/SE2004/002023 filed on Dec. 28, 2004 which claims the benefit of U.S. Provisional Application No. 60/568,434, filed May 5, 2004 entitled "HSDPA Flow Control Data Frame Delay RNC Reference Time". This particular invention detects and corrects an Iub problem that is associated with too long of buffer delays and can be used in conjunction with the present invention. The contents of this patent application are hereby incorporated by reference herein The present invention makes it possible for the RBS Flow Control Algorithm to detect Iub congestion in a better way and to improve the cell change characteristics.

It should be noted that certain details associated with the components within the third generation cellular network 100 like the RNC 102 and RBS 104 are well known in the industry. Therefore, for clarity, the description provided above in relation to the RNC 102 and RBS 104 omits those well known details that are not necessary to understand the present invention.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

For instance, a possible extension of the present invention is that it can be related to a fast uplink shared channel associated with HSUPA (High Speed Uplink Packet Access) and E-DCH (Enhanced DCH). In this case, HSUPA data frames are sent for RBS to RNC (other direction than HSDPA), and the loss of these packets should be detected in the RNC. Because, there is currently no accepted congestion detection technique for E-DCH and there is no FN in the E-DCH data frame.

What is claimed is:

1. A radio base station, comprising:
a flow control mechanism that receives a high-speed downlink shared channel (HS-DSCH) data frame and then inspects a frame sequence number located within the received HS-DSCH data frame to determine if one or more HS-DSCH data frames that were previously transmitted have been lost, wherein
said flow control mechanism is adapted to decrease a bit rate of a priority queue flow associated with the HS-DSCH data frame and the one or more lost HS-DSCH data frames by transmitting a message to the radio network controller after a predetermined number of lost HS-DSCH data frames have been detected,
said flow control mechanism determines one or more HS-DSCH data frames that were previously transmitted have been lost by determining if the frame sequence numbers in consecutively received HS-DSCH data frames are out of sequence,
said flow control mechanism is adapted to detect at least ne damaged HS-DSCH frame, wherein
a HS-DSCH frame is damaged when one or more asynchronous transfer mode (ATM) cell is lost out of the HS-DSCH frame,
said flow control mechanism decreases a maximum bit rate for all HS traffic after a predetermined number of lost HS-DSCH data frames have been detected during a predetermined period of time, and
said flow control mechanism decreases the maximum bit rate for all HS traffic after a predetermined number of damaged HS-DSCH data frames have been detected during the predetermined period of time.

2. The radio base station of claim 1, wherein said frame sequence number is a 4-bit frame sequence number.

3. The radio base station of claim 1, wherein:
said flow control mechanism increases the maximum bit rate for all of the HS traffic after a predetermined period of time during which a number of detected lost HS-DSCH data frames has not exceeded a predetermined threshold.

4. The radio base station of claim 1, wherein:
said flow control mechanism also inspects a cyclic redundancy check (CRC) and length indicator (LI) in the received HSDPA HS-DSCH data frame to determine if one or more HS-DSCH data frames that were previously transmitted towards said flow control mechanism have been damaged.

5. A radio network controller, comprising:
a flow control mechanism that generates and transmits a high-speed downlink shared channel (HS-DSCH) data frame, which has a frame sequence number located therein that was added by the radio network controller, over a transport link to a radio base station, and
said radio base station receives the HS-DSCH data frame and then inspects the frame sequence number located therein to determine if one or more HS-DSCH data frames that were previously transmitted by said radio network controller towards said radio base station have been lost, wherein
said flow control mechanism is adapted to decrease a bit rate of a priority queue flow associated with the HS-DSCH data frame and the one or more lost HS-DSCH data frames responsive to receiving a message from the radio base station after a predetermined number of lost HS-DSCH data frames have been detected,
the flow control mechanism determines one or more HS-DSCH data frames that were previously transmitted have been lost responsive to determining if the frame sequence numbers in consecutively received HS-DSCH data frames are out of sequence,
said flow control mechanism is adapted to detect at least one damaged HS-DSCH frame, wherein a HS-DSCH frame is damaged when one or more asynchronous transfer mode (ATM) cell is lost out of the HS-DSCH frame,
said flow control mechanism decreases a maximum bit rate for all HS traffic after a predetermined number of lost HS-DSCH data frames have been detected during a predetermined period of time, and
said flow control mechanism decreases the maximum bit rate for all HS traffic after a predetermined number of damaged HS-DSCH data frames have been detected during the predetermined period of time.

6. The radio network controller of claim 5, wherein said frame sequence number is a 4-bit frame sequence number.

7. The radio network controller of claim 5, wherein said HS-DSCH Data frame belongs to one MAC-d CMCH-PI flow.

8. A cellular system, characterized by:
a radio network controller:
a transport link; and
a radio base station, wherein
said radio network controller generates a high-speed downlink shared channel (HS-DSCH) data frame and adds a frame sequence number therein and then transmits the HS-DSCH data frame over said transport link to said radio base station, and
said radio base station receives the HS-DSCH data frame and then inspects the frame sequence number therein to determine if one or more HS-DSCH data frames that were previously transmitted by said radio network controller towards said radio base station have been lost, wherein
said radio base station, upon detecting a predetermined number of lost HS-DSCH data frames, sends a message to said radio network controller instructing said radio network controller to decrease a bit rate of a priority queue flow (PQF) associated with the HS-DSCH data frame and the one or more lost HS-DSCH data frames, and
said radio base station determines one or more HS-DSCH data frames that were previously transmitted have been lost by determining if the frame sequence numbers in consecutively received HS-DSCH data frames are out of sequence,
said radio base station determines at least one damaged HS-DSCH frame, wherein a HS-DSCH frame is damaged when one or more asynchronous transfer mode (ATM) cell is lost out of the HS-DSCH frame,
said radio base station, upon detecting a predetermined number of lost HS-DSCH data frames over a predetermined period of time, sends a message to said radio network controller instructing said radio network controller to decrease a maximum bit rate for all HS traffic which is sent over said transport link to said radio base station; and
said radio base station, upon detecting a predetermined number of damaged HS-DSCH data frames over the predetermined period of time, sends a message to said radio network controller instructing said radio network controller to decrease the maximum bit rate for all HS traffic which is sent over said transport link to said radio base station.

9. The cellular system of claim 8, wherein said frame sequence number is a 4-bit frame sequence number.

10. The cellular system of claim 8, wherein said HS-DSCH Data frame belongs to one MAC-d CMCH-PI flow.

11. The cellular system of claim 8, wherein:
said radio base station increases the maximum bit rate for all of the HS traffic after a predetermined period of time during which a number of detected lost HS-DSCH data frames has not exceeded a predetermined threshold.

12. The cellular system of claim 8, wherein:
said radio base station also inspects a cyclic redundancy check (CRC) and length indicator (LI) in the received HSDPA HS-DSCH Data frame to determine if one or more HS-DSCH data frames that were previously transmitted by said radio network controller towards said radio base station have been damaged.

13. A method for detecting a problem with a transport link between a radio network controller and a radio base station in a cellular system, said method characterized by the step of:
receiving, at said radio base station, a high-speed downlink shared channel (HS-DSCH) data frame;
inspecting, at said radio base station, a frame sequence number located within the received HS-DSCH data frame to determine if one or more HS-DSCH data frames that were previously transmitted by said radio network controller have been lost;
instructing said radio network controller to decrease a bit rate of a priority queue flow associated with the HS-DSCH data frame and the one or more lost HS-DSCH data frames by transmitting a message from the radio base station to the radio network controller after a predetermined number of lost HS-DSCH data frames have been detected;
determining one or more HS-DSCH data frames that were previously transmitted have been lost by determining if the frame sequence numbers in consecutively received HS-DSCH data frames are out of sequence;
determining at least one damaged HS-DSCH frame, wherein a HS-DSCH frame is damaged when one or more asynchronous transfer mode (ATM) cell is lost out of the HS-DSCH frame;
instructing said radio network controller to decrease a maximum bit rate for all HS traffic after a predetermined number of lost HS-DSCH data frames have been detected during a predetermined period of time; and
instructing said radio network controller to decrease the maximum bit rate for all HS traffic after a predetermined number of damaged HS-DSCH data frames have been detected during the predetermined period of time.

14. The method of claim 13, wherein said frame sequence number is a 4-bit frame sequence number.

15. The method of claim 13, wherein said radio base station instructs said radio network controller to increase the maximum bit rate for all of the HS traffic after a predetermined period of time during which a number of detected lost HS-DSCH data frames has not exceeded a predetermined threshold.

16. The method of claim 13, wherein said radio base station also inspects a cyclic redundancy check (CRC) and length indicator (LI) in the received HSDPA HS-DSCH data frame to determine if one or more HS-DSCH data frames that were previously transmitted by said radio network controller have been damaged.

\* \* \* \* \*

UNITED STATES PATENT AND TRADEMARK OFFICE
CERTIFICATE OF CORRECTION

PATENT NO. : 8,488,464 B2
APPLICATION NO. : 11/568533
DATED : July 16, 2013
INVENTOR(S) : Lundh et al.

Page 1 of 1

It is certified that error appears in the above-identified patent and that said Letters Patent is hereby corrected as shown below:

In the Specification

In Column 1, Line 56, delete "to" and insert -- too --, therefor.

In Column 2, Line 31, delete "RES 104" and insert -- RBS 104 --, therefor.

In Column 3, Line 53, delete "ore" and insert -- or --, therefor.

In Column 6, Line 5, delete "2721 }" and insert -- 272} --, therefor.

In Column 6, Line 7, delete "1761 }" and insert -- 176} --, therefor.

In Column 7, Line 11, delete "SDUS" and insert -- SDUs --, therefor.

In Column 8, Line 23, delete "60/568,389" and insert -- 60/568,389, --, therefor.

In Column 8, Line 29, delete "reference" and insert -- reference. --, therefor.

In Column 8, Line 41, delete "herein" and insert -- herein. --, therefor.

In the Claims

In Column 9, Line 21, in Claim 1, delete "ne" and insert -- one --, therefor.

In Column 10, Line 24, in Claim 8, delete "controller:" and insert -- controller; --, therefor.

In Column 11, Line 4, in Claim 10, delete "Data" and insert -- data --, therefor.

In Column 11, Line 12, in Claim 12, delete "Data" and insert -- data --, therefor.

Signed and Sealed this
Seventh Day of January, 2014

Margaret A. Focarino
*Commissioner for Patents of the United States Patent and Trademark Office*